(12) United States Patent
Chen et al.

(10) Patent No.: US 12,494,217 B2
(45) Date of Patent: Dec. 9, 2025

(54) VOICE AWAKENING METHOD AND APPARATUS, DEVICE, AND MEDIUM

(71) Applicant: Honor Device Co., Ltd., Shenzhen (CN)

(72) Inventors: Liwen Chen, Shenzhen (CN); Ke Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 916 days.

(21) Appl. No.: 17/598,702

(22) PCT Filed: Mar. 26, 2020

(86) PCT No.: PCT/CN2020/081341
§ 371 (c)(1),
(2) Date: Jul. 29, 2022

(87) PCT Pub. No.: WO2020/192721
PCT Pub. Date: Oct. 1, 2020

(65) Prior Publication Data
US 2023/0031491 A1    Feb. 2, 2023

(30) Foreign Application Priority Data
Mar. 28, 2019  (CN) .......................... 201910243897.3

(51) Int. Cl.
*G10L 21/0216* (2013.01)
*G10L 25/51* (2013.01)

(52) U.S. Cl.
CPC .......... *G10L 21/0216* (2013.01); *G10L 25/51* (2013.01); *G10L 2021/02166* (2013.01)

(58) Field of Classification Search
CPC ................. G10L 21/0216; G10L 25/51; G10L 2021/02166
See application file for complete search history.

(56) References Cited

U.S. PATENT DOCUMENTS

| | | | |
|---|---|---|---|
| 10,051,366 B1 | 8/2018 | Buoni et al. | |
| 10,109,294 B1* | 10/2018 | Ayrapetian | G10L 21/0208 |
| 10,304,475 B1* | 5/2019 | Wang | G01S 3/80 |
| 11,074,924 B2 | 7/2021 | Geng | |

(Continued)

FOREIGN PATENT DOCUMENTS

| | | |
|---|---|---|
| CN | 106710603 A | 5/2017 |
| CN | 107018470 A | 8/2017 |

(Continued)

*Primary Examiner* — Athar N Pasha
(74) *Attorney, Agent, or Firm* — Conley Rose, P.C.

(57) ABSTRACT

A voice awakening method and apparatus, a device, and a medium are provided. The voice awakening method includes collecting a voice signal by using a microphone array; separately performing denoising processing on the voice signal by using N beamforming denoising algorithms to obtain N denoising signals, where each beamforming denoising algorithm corresponds to one of N areas, different beamforming denoising algorithms correspond to different areas, a union set of the N areas covers a signal collection area of the microphone array, and N is a positive integer greater than 1; and performing voice awakening by using an awakening engine based on at least one of the N denoising signals.

20 Claims, 6 Drawing Sheets (56) References Cited

U.S. PATENT DOCUMENTS

| | | | | |
|---|---|---|---|---|
| 2011/0054891 | A1* | 3/2011 | Vitte | H04R 3/005 |
| | | | | 381/94.1 |
| 2013/0343558 | A1* | 12/2013 | Fox | G10L 21/0208 |
| | | | | 381/71.14 |
| 2015/0063579 | A1* | 3/2015 | Bao | H04M 9/082 |
| | | | | 381/66 |
| 2015/0281839 | A1* | 10/2015 | Bar-On | G10L 21/0272 |
| | | | | 381/71.7 |
| 2018/0033428 | A1 | 2/2018 | Kim et al. | |
| 2019/0073999 | A1 | 3/2019 | Prémont et al. | |
| 2019/0080692 | A1 | 3/2019 | R et al. | |
| 2021/0174812 | A1* | 6/2021 | Gao | G10L 15/22 |

FOREIGN PATENT DOCUMENTS

| | | |
|---|---|---|
| CN | 107464565 A | 12/2017 |
| CN | 108538305 A | 9/2018 |
| CN | 109192203 A | 1/2019 |
| CN | 109272989 A | 1/2019 |
| CN | 109448708 A | 3/2019 |
| CN | 109949810 A | 6/2019 |

* cited by examiner

VOICE AWAKENING METHOD AND APPARATUS, DEVICE, AND MEDIUM

CROSS-REFERENCE TO RELATED APPLICATIONS

This application is a U.S. National Stage of International Patent Application No. PCT/CN2020/081341 filed on Mar. 26, 2020, which claims priority to Chinese Patent Application No. 201910243897.3, filed with the China National Intellectual Property Administration on Mar. 28, 2019, both of which are incorporated herein by reference in their entirety.

TECHNICAL FIELD

This application relates to the voice interaction field, and in particular, to a voice awakening method and apparatus, a device, and a computer-readable storage medium.

BACKGROUND

As voice recognition technologies develop, voice interaction has gradually become a popular control manner. To implement voice interaction, a device first needs to be activated from a sleep state to a running state by using a voice, that is, voice awakening is required. The voice awakening serves as an entrance of voice interaction, and an awakening effect of the voice awakening directly affects voice interaction experience.

The voice awakening specifically means that a target keyword is detected in a continuous voice stream to awaken a device or awaken an application. Currently, the industry mainly uses a beamforming (beamforming)-based microphone array voice enhancement method to implement voice awakening. Specifically, an input voice is spatially filtered by using spatial phase information included in voice signals received by a plurality of microphones, to form a directional spatial beam, and then, a voice signal in a specified direction is enhanced, thereby achieving a better enhancement effect than a single microphone. The beamforming-based microphone array voice enhancement method includes a fixed beamforming method and an adaptive beamforming method.

The fixed beamforming method is generally applied to a scenario in which a location of a sound source is unknown. Beams at several orientations are selected for denoising, and then a denoised voice signal is transmitted to an awakening engine. The awakening engine screens the awakening engine to determine the location of the sound source. Then a beam direction is locked based on a screening result of the awakening engine to perform denoising. Then keyword detection is performed on the denoised voice signal, so as to implement voice awakening. However, this method cannot perform strong denoising on a voice signal outside the beam, limiting denoising performance before awakening. In the case of a low signal-to-noise ratio, the orientation information screened by the awakening engine is at risk of incorrect positioning. When the sound source is positioned incorrectly; the denoising algorithm may fail, causing a failure of awakening.

The adaptive beamforming method is generally applied to a scenario in which a location of a sound source is known. A camera, an infrared sensor, or the like is used to perform auxiliary positioning to obtain sound source location information in advance, and the sound source location information is sent to a front-end denoising algorithm to lock the beam, thereby enhancing performance of the denoising algorithm and improving a voice awakening effect. However, this method requires additional hardware-assisted positioning, and requires high positioning accuracy. When the positioning accuracy cannot meet a requirement, the denoising performance may be degraded. In addition, implementation of this solution is complex, and it is difficult to completely cover many scenarios and reliability is poor.

SUMMARY

In view of this, this application provides a voice awakening method and apparatus, a device, a medium, and a computer program product, so as to improve denoising performance and achieve a good voice awakening effect without increasing additional costs.

A first aspect of embodiments of this application provides a voice awakening method. The method is applied to an electronic device. The electronic device collects a voice signal by using a microphone array; and separately performs denoising processing on the voice signal by using N beamforming denoising algorithms to obtain N denoising signals, where each beamforming denoising algorithm corresponds to one of N areas, and different beamforming denoising algorithms correspond to different areas. Therefore, the electronic device can perform denoising processing on the voice signal based on a beam in the area corresponding to each beamforming denoising algorithm, and the denoising performance of the electronic device is not limited.

A union set of the N areas covers a signal collection area of the microphone array; and N is a positive integer greater than 1. In this way, a sound source is inevitably located in at least one of the N areas. At least one of the foregoing N beamforming denoising algorithms correctly locates the sound source. At least one of the N denoising signals obtained through denoising by using the N beamforming denoising algorithms has a good signal-to-noise ratio. The electronic device performs voice awakening by using an awakening engine based on at least one of the N denoising signals, for example, a denoising signal with a good signal-to-noise ratio. The electronic device features a high awakening success rate and improves a voice awakening effect. In this method, N beamforming denoising algorithms corresponding to different areas are used to perform denoising processing on the voice signal to implement voice awakening, without requiring an additional hardware device for assisted positioning. On the one hand, costs are reduced, and on the other hand, the method is easy to implement and popularize.

In a first implementation of the first aspect of the embodiments of this application, a higher hardware processing capability of the electronic device, for example, a higher computing capability of the processor, indicates a larger quantity of voice signals that the electronic device can process. In this case, the signal collection area of the microphone array may be divided at a finer granularity; and a beam of each beamforming denoising algorithm is narrowed to obtain better denoising performance. Based on this, the electronic device can determine a value of N based on its own hardware processing capability; and then divide the signal collection area based on the value of N to obtain the N areas.

In a second implementation of the first aspect of the embodiments of this application, the electronic device may set the value of N based on a service scenario type corresponding to the current service scenario, and divide the signal collection area based on the value of N to obtain N areas, thereby obtaining better denoising performance and improving voice awakening performance while meeting a requirement of the current service scenario. For example, in a low-power service scenario, N is set to a relatively small value to reduce a calculation amount, thereby reducing power consumption.

Further, in a third implementation of the first aspect of the embodiments of this application, the electronic device searches for a parameter configuration file based on the current service scenario type, and determines the value of N that matches the current service scenario type. In this way; when the service scenario of the electronic device changes, the value of N can be automatically switched, so that the electronic device has good awakening performance in any service scenario.

In a fourth implementation of the first aspect of the embodiments of this application, the N areas may be obtained by evenly dividing the signal collection area based on an angle. In this way; beam angles corresponding to the areas are the same. When N beamforming denoising algorithms are used to perform denoising processing on the voice signal, a good balance is achieved.

In a fifth implementation of the first aspect of the embodiments of this application, the electronic device may use only one microphone array to collect the voice signal. In this way, when the electronic device separately performs denoising processing on the voice signal by using N beamforming denoising algorithms to obtain N denoising signals, the electronic device can first copy the voice signal to obtain N voice signals, and then perform denoising processing on the N voice signals by using N beamforming denoising algorithms to obtain N denoising signals. Each beamforming denoising algorithm is used to process one of the N voice signals, and different beamforming denoising algorithms are used to process different voice signals.

In this case, the electronic device obtains N voice signals by copying the voice signal. This can greatly reduce the quantity of microphone arrays to be used, thereby reducing hardware costs.

In a sixth implementation of the first aspect of the embodiments of this application, the electronic device can use a plurality of microphone arrays to collect voice signals. Each microphone array can collect one voice signal, and a plurality of microphone arrays can collect a plurality of voice signals. When the plurality of voice signals are N voice signals, and when the electronic device separately performs denoising processing on the voice signals by using N beamforming denoising algorithms to obtain N denoising signals, the electronic device can directly perform denoising processing on the N voice signals by using N beamforming denoising algorithms to obtain N denoising signals. Each beamforming denoising algorithm is used to process one of the N voice signals, and different beamforming denoising algorithms are used to process different voice signals. That is, the N beamforming denoising algorithms are in a one-to-one correspondence with the N voice signals.

In this case, the electronic device collects N voice signals by using its own microphone array; and does not need to perform additional copy processing on the foregoing voice signals. This not only reduces the requirement for the hardware processing capability of the electronic device, but also saves time taken for copying the voice signal and improves an awakening rate.

In a seventh implementation of the first aspect of the embodiments of this application, the electronic device can specifically use an adaptive beamforming denoising algorithm to perform denoising processing on the voice signal. Because each beamforming denoising algorithm corresponds to one of the N areas, which is equivalent to that each beamforming denoising algorithm determines one location of a sound source. Therefore, using the adaptive beamforming denoising algorithm can enhance the voice signal in the specified direction to obtain a better denoising effect and improve awakening performance.

In an eighth implementation of the first aspect of the embodiments of this application, the electronic device may set an awakening policy for voice awakening, so as to reduce a false awakening rate. Specifically; the electronic device can determine similarity between each of the N denoising signals and an awakening word by using an awakening engine according to an awakening algorithm. Based on this, the electronic device can perform voice awakening based on the similarity.

Further, in a ninth implementation of the first aspect of the embodiments of this application, the electronic device may set a corresponding awakening policy according to actual needs. One awakening policy is that if an average value of the similarity between each of the N denoising signals and the awakening word is greater than a preset threshold, voice awakening is performed. Another awakening policy is that if the similarity between a preset quantity of denoising signals among the N denoising signals and the awakening word is greater than the preset threshold, voice awakening is performed. Certainly, in actual application, the foregoing awakening policies may alternatively be used in combination. Specifically; if an average value of the similarity between each of the N denoising signals and the awakening word is greater than a preset threshold, and if the similarity between a preset quantity of denoising signals among the N denoising signals and the awakening word is greater than the preset threshold, voice awakening is performed.

A second aspect of embodiments of this application provides a voice awakening apparatus, where the apparatus includes:

a collection module, configured to collect a voice signal by using a microphone array;

a denoising module, configured to separately perform denoising processing on the voice signal by using N beamforming denoising algorithms to obtain N denoising signals, where each beamforming denoising algorithm corresponds to one of N areas, different beamforming denoising algorithms correspond to different areas, a union set of the N areas covers a signal collection area of the microphone array; and N is a positive integer greater than 1; and an awakening module, configured to perform voice awakening by using an awakening engine based on at least one of the N denoising signals.

A third aspect of embodiments of this application provides an electronic device, where the electronic device includes a microphone array, a processor, and a memory:

the microphone array is configured to collect a voice signal;

the memory is configured to store program code; and the processor is configured to perform the following steps according to an instruction in the program code;

separately performing denoising processing on the voice signal by using N beamforming denoising algorithms to obtain N denoising signals, where each beamforming denoising algorithm corresponds to one of N areas, different beamforming denoising algorithms correspond to different areas, a union set of the N areas covers a signal collection area of the microphone array; and N is a positive integer greater than 1; and performing voice awakening by using an awakening engine based on at least one of the N denoising signals.

In a first implementation of the third aspect of the embodiments of this application, the processor is further configured to perform the following steps:

determining a value of N based on a hardware processing capability; and dividing the signal collection area based on the value of N to obtain the N areas.

In a second implementation of the third aspect of the embodiments of this application, the processor is further configured to perform the following steps:

determining the value of N based on a current service scenario type; and dividing the signal collection area based on the value of N to obtain the N areas.

In a third implementation of the third aspect of the embodiments of this application, the processor is further configured to perform the following step:

searching for a parameter configuration file based on the current service scenario type, and determining the value of N that matches the current service scenario type.

In a fourth implementation of the third aspect of the embodiments of this application, the processor is further configured to:

evenly divide the signal collection area based on an angle to obtain the N areas.

In a fifth implementation of the third aspect of the embodiments of this application, there is only one microphone array; and the processor is specifically configured to: when performing denoising processing to obtain N denoising signals, copy the voice signal to obtain N voice signals; and perform denoising processing on the N voice signals by using N beamforming denoising algorithms to obtain N denoising signals, where each beamforming denoising algorithm is used to process one of the N voice signals, and different beamforming denoising algorithms are used to process different voice signals.

In a sixth implementation of the third aspect of the embodiments of this application, there are a plurality of microphone arrays: each microphone array collects one voice signal, and the plurality of microphone arrays collect a plurality of voice signals; and the processor is specifically configured to:

when the plurality of voice signals are N voice signals, perform denoising processing on the N voice signals by using N beamforming denoising algorithms to obtain N denoising signals, where each beamforming denoising algorithm is used to process one of the N voice signals, and different beamforming denoising algorithms are used to process different voice signals.

In a seventh implementation of the third aspect of the embodiments of this application, the beamforming denoising algorithms include an adaptive beamforming denoising algorithm.

In an eighth implementation of the third aspect of the embodiments of this application, the processor is specifically configured to: when performing voice awakening by using the awakening engine based on at least one of the N denoising signals, determine similarity between each of the N denoising signals and an awakening word by using the awakening engine; and perform voice awakening based on the similarity:

In a ninth implementation of the third aspect of the embodiments of this application, that the processor performs voice awakening based on the score specifically includes:

performing voice awakening if an average value of the similarity between each of the N denoising signals and the awakening word is greater than a preset threshold, and/or the similarity between a preset quantity of denoising signals among the N denoising signals and the awakening word is greater than the preset threshold.

A fourth aspect of embodiments of this application provides a computer-readable storage medium, where the computer-readable storage medium is configured to store program code, and the program code is used to perform the voice awakening method according to the first aspect of the embodiments of this application.

A fifth aspect of embodiments of this application provides a computer program product that includes a computer-readable instruction, where when the computer-readable instruction runs on a computer, the computer is enabled to perform the voice awakening method according to the first aspect of the embodiments of this application.

DESCRIPTION OF EMBODIMENTS

To make persons skilled in the art understand the technical solutions in this application better, the following describes the technical solutions in the embodiments of this application with reference to the accompanying drawings in the embodiments of this application.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way is interchangeable in proper circumstances so that the embodiments of this application described herein can be, for example, implemented in other orders than the order illustrated or described herein. In addition, the terms "include", "comprise", "have", and any other variants thereof are intended to cover non-exclusive inclusion. For example, a process, method, system, product, or device that includes a series of steps or units is unnecessarily limited to those expressly listed steps or units, but may include other steps or units that are not expressly listed or that are inherent to such a process, method, system, product, or device.

The fixed beamforming method currently used in the industry cannot perform strong denoising on a voice signal outside the beam, limiting denoising performance before awakening. In the case of a low signal-to-noise ratio, the orientation information screened by the awakening engine is at risk of incorrect positioning, and consequently; the denoising algorithm may fail and the system cannot be awakened. The adaptive beamforming method requires additional hardware-assisted positioning, and requires high positioning accuracy: In addition, implementation of this solution is complex, and it is difficult to completely cover many scenarios and reliability is poor. To resolve the foregoing technical problems, this application provides a voice awakening method in which a plurality of beamforming denoising algorithms are used to separately perform denoising on the voice signal, so as to improve the awakening performance.

Specifically; the signal collection area of the microphone array may be divided into N parts to form N areas, and a union set of the N areas covers the signal collection area of the microphone array: In this way; a sound source is inevitably located in at least one of the N areas. Then, N beamforming denoising algorithms in a one-to-one correspondence with the areas are provided. In this way; when the voice signal collected by the microphone array is received, the N beamforming denoising algorithms are used to separately perform denoising processing on the voice signal to obtain N denoising signals. At least one of the foregoing N beamforming denoising algorithms correctly locates the sound source. At least one of the N denoising signals obtained through denoising by using the N beamforming denoising algorithms has a good signal-to-noise ratio. Therefore, voice awakening can be performed by using an awakening engine based on at least one of the N denoising signals, featuring a high awakening success rate and improving a voice awakening effect.

It can be understood that the voice awakening method provided in this application may be applied to an electronic device. The electronic device may be any device with a voice interaction function, including but not limited to a smart speaker, a smart household appliance, a smartphone, a tablet computer, a vehicle-mounted device, a wearable device, an augmented reality (AR)/virtual reality (VR) device, and the like that have a voice interaction function. The voice awakening method provided in this application may be specifically stored in the electronic device in a form of an application program or software, and the electronic device executes the application program or software to implement the voice awakening method provided in this application.

Figure 1:
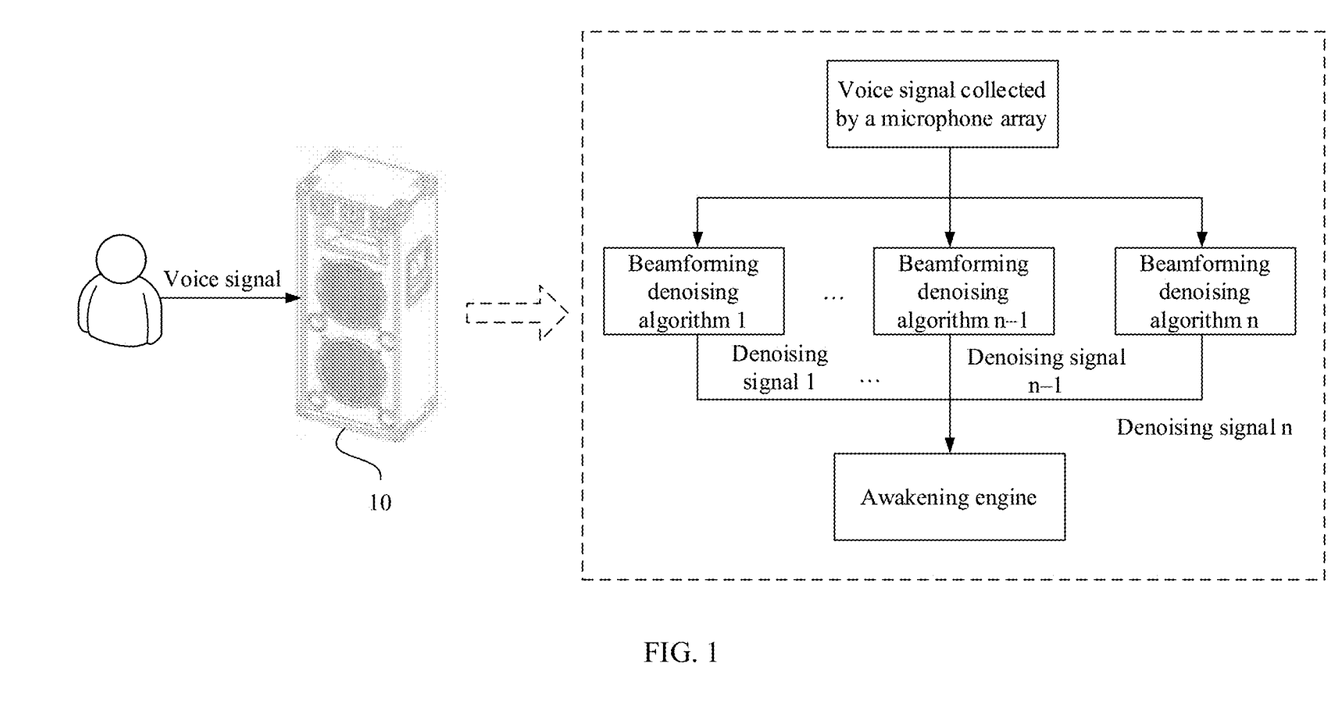
FIG. 1 is an architectural diagram of a scenario of a voice awakening method according to an embodiment of this application.

To make the technical solutions in this application clearer and easier to understand, a system framework of the voice awakening method provided in this application is first described with reference to specific scenarios. FIG. 1 is an architectural diagram of a scenario of a voice awakening method. The scenario includes a smart speaker 10. A user makes a voice, and the smart speaker 10 collects a voice signal by using a microphone array: Denoising processing is separately performed on the voice signal by using N beamforming denoising algorithms to obtain N denoising signals, and then voice awakening is performed by using an awakening engine based on at least one of the N denoising signals, so that the smart speaker 10 is activated from a sleep state to a running state.

It should be noted that FIG. 1 uses a smart speaker as an example for description. In another possible implementation of the embodiments of this application, a smart household appliance such as a smart refrigerator or a smart TV, or an electronic device such as a smartphone may alternatively be used to implement the voice awakening method provided in this application.

Figure 2:
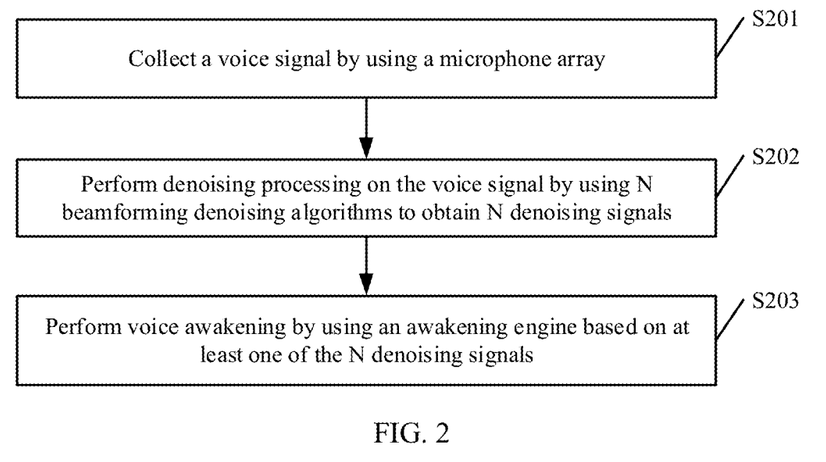
FIG. 2 is a flowchart of a voice awakening method according to an embodiment of this application.

Next, from the perspective of an electronic device, the voice awakening method provided in this application is described in detail. FIG. 2 is a flowchart of a voice awakening method. The method includes the following steps:

S201: Collect a voice signal by using a microphone array:

The microphone array specifically refers to an arrangement of a plurality of microphones, and the microphone array can be used to sample and process a spatial characteristic of a sound field. Specifically; in the embodiments of this application, the microphone array may be linear, annular, or spherical. A quantity of elements of the microphone array; that is, a quantity of microphones, may be set according to actual needs. In some specific examples of this application, the microphone array may be a 2-microphone array; a 4-microphone array; a 6-microphone array; or an 8-microphone array:

The microphone array has a signal collection area, and the signal collection area is specifically an area in which the microphone array can collect a voice signal. For example, for an electronic device such as a TV, the signal collection area of the microphone array may be a 180° spatial area in front of the TV. For another example, for a device such as a speaker, the signal collection area of the microphone array includes a 360° spatial area surrounding the microphone array:

The microphone array can collect a voice signal emitted by a sound source located in the signal collection area. The sound source may be a user. Certainly, in some possible implementations, the sound source may alternatively be another electronic device. For example, in a smart household system, a smart TV can send a voice command for turning on a speaker, and a microphone array of the smart speaker can collect a voice signal emitted by the smart TV and perform voice recognition based on the voice signal, so as to determine whether to execute the foregoing voice command. In actual application, there may be one or more sound sources, and the microphone array can collect voice signals emitted by the one or more sound sources at the same time.

In consideration of hardware costs, the electronic device may use only one microphone array to collect the voice signal, and perform denoising processing based on the voice signal to implement voice awakening. Certainly, the electronic device may alternatively use a plurality of microphone arrays to collect voice signals. In this case, the electronic device can collect a plurality of voice signals by using the plurality of microphone arrays, and perform denoising processing based on the plurality of voice signals to implement voice awakening.

S202: Perform denoising processing on the voice signal by using N beamforming denoising algorithms to obtain N denoising signals.

Each beamforming denoising algorithm corresponds to one of N areas, different beamforming denoising algorithms correspond to different areas, a union set of the N areas covers a signal collection area of the microphone array; and N is a positive integer greater than 1.

That the union set of the N areas covers the signal collection area of the microphone array includes two cases. One case is that there is no intersection between the areas, that is, there is no overlap between the areas. The other case is that there is an intersection between the areas, that is, there is an overlap between some areas. It should be noted that when the quantity of areas remains the same and there is no overlap between the areas, a finer granularity for dividing the signal collection area and a narrower beam lead to relatively more accurate positioning of the sound source.

Figure 3A:
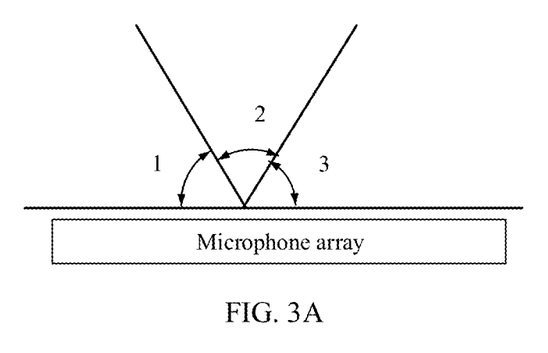
FIG. 3A is an example diagram of area distribution according to an embodiment of this application.
Figure 3B:
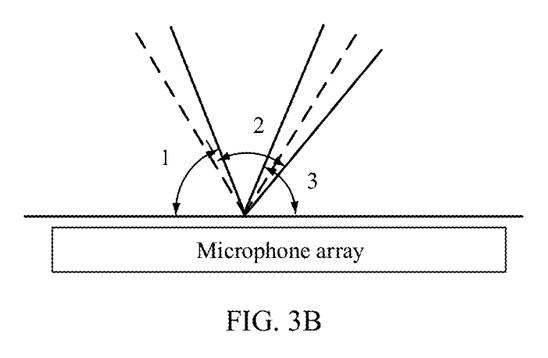
FIG. 3B is an example diagram of area distribution according to an embodiment of this application.

For ease of understanding, that the union set of the N areas covers the signal collection area of the microphone array is described in detail with reference to specific examples. FIG. 3A shows an example of the area without an overlap. In this example, the signal collection area of the microphone array is a 180° spatial area, and the N areas include areas in the signal collection area corresponding to three angle ranges: 0° to 60°, 60° to 120°, and 120° to 180°, as shown in parts 1, 2, and 3 in FIG. 3A. FIG. 3B shows an example of the area with an overlap. In this example, the signal collection area of the microphone array is a 180° spatial area, and the N areas include areas in the signal collection area corresponding to three angle ranges: 0° to 70°, 60° to 130°, and 110° to 180°, as shown in parts 1, 2, and 3 in FIG. 3B.

The beamforming denoising algorithm implements denoising based on a beamforming principle. The beamforming principle is specifically as follows: An appropriate weighting vector is selected to compensate for a propagation delay of each element in the microphone array, so that outputs of the array can be superimposed in a same desired direction. Further, the array generates a main lobe beam in this direction, and can suppress interference in a specific direction to some extent. In this way, when the beamforming denoising algorithm corresponds to an area i, where i is a positive integer greater than or equal to 1 and less than or equal to N, the outputs of the array can be superimposed in the same direction corresponding to the area i, and the array generates a main lobe beam in this direction and suppresses interference noise in this direction.

The N beamforming denoising algorithms correspond to N different areas in the signal collection area. Therefore, when the electronic device uses the N beamforming denoising algorithms to perform denoising processing on the voice signal, it is equivalent to that beams of the N areas are separately locked to perform denoising processing on the voice signal. In other words, the electronic device separately performs denoising processing on the voice signal by assuming that the sound source is in area 1, area 2, . . . , and area N, to obtain N denoising signals. Because the union set of the N areas covers the signal collection area, the sound source is inevitably located in at least one of the N areas, that is, at least one of the foregoing assumptions is correct. In this case, at least one denoising module can reduce the noise in the direction of the location of the sound source, and does not treat a sound emitted by the sound source as noise to be suppressed, and does not limit the denoising performance due to uncertainty of the location of the sound source, either.

Because each beamforming denoising algorithm locks the beam in one area, in this case, the electronic device can perform denoising processing on the voice signal by using the adaptive beamforming denoising algorithm based on the beam in the area corresponding to each algorithm. Enhancing the voice signal in the corresponding direction can achieve a good denoising effect and improve the awakening performance.

The adaptive beamforming denoising algorithm uses an adaptive algorithm to achieve optimization of a weight set under a specific optimal criterion. The adaptive beamforming denoising algorithm can adapt to various environmental changes and adjust the weight set to be close to the best location in real time. The optimal criterion may be specifically the minimum mean square error (mean square error, MSE) criterion, the maximum signal-to-noise ratio (signal noise ratio, SNR) criterion, the maximum likelihood ratio (likelihood ratio, LH) criterion, the minimum noise variance (noise variance, NV) criterion, or the like.

Adaptive algorithms are mainly divided into closed-loop algorithms and open-loop algorithms. The closed-loop algorithms include but are not limited to the least mean square (least mean square, LMS) algorithm, the difference steepest descent (difference steepest descent, DSD) algorithm, the acceleration gradient (acceleration gradient, AG) algorithm, and variant algorithms of the foregoing algorithms. The open-loop algorithms include direct inversion methods, such as sample matrix inversion (SampleMatrixInversion, SMI) and direct matrix inversion (DirectMatrixInversion, DMI).

The closed-loop algorithm is easy to implement, reliable in performance, and does not require data storage. The open-loop algorithm has a good convergence speed and cancellation performance. The corresponding adaptive algorithm may be selected according to actual needs to achieve the optimization of the weight set, thereby implementing voice denoising.

It should be noted that when there is only one microphone array, the electronic device first copies the voice signal to obtain N voice signals, and then performs denoising processing on the N voice signals by using N beamforming denoising algorithms to obtain N denoising signals, where each beamforming denoising algorithm is used to process one of the N voice signals, and different beamforming denoising algorithms are used to process different voice signals.

When there are N microphone arrays, and the voice signals collected by the microphone arrays are N voice signals, the electronic device performs denoising processing on the N voice signals by using N beamforming denoising algorithms to obtain N denoising signals, where each beamforming denoising algorithm is used to process one of the N voice signals, and different beamforming denoising algorithms are used to process different voice signals.

S203: Perform voice awakening by using an awakening engine based on at least one of the N denoising signals.

In this embodiment, the awakening engine is specifically a voice awakening engine, that is, a core component that awakens a device or awakens an application is implemented through a voice. The awakening engine is generally expressed in the form of software, such as a main program of voice interaction software. The awakening engine specifically determines similarity between a signal input into the awakening engine and an awakening word by using an awakening algorithm, and implements voice awakening based on the similarity.

Because there is at least one signal with a good signal-to-noise ratio among the N denoising signals, the electronic device can perform an awakening word detection operation by using the awakening engine based on at least one of the N denoising signals, such as the foregoing signal with a good signal-to-noise ratio, thereby increasing the probability of detecting the awakening word. When the awakening word is detected, an awakening event may be generated to awaken the electronic device or awaken the application in the electronic device. In this way, this method improves an awakening success rate.

It should be noted that when the electronic device performs voice awakening by using the awakening engine based on at least one of the denoising signals, the electronic device can use N awakening engines to process the N denoising signals. Each awakening engine processes one denoising signal, and the denoising signals processed by the awakening engines are different, so that awakening words can be detected concurrently; detection time can be shortened, and an awakening rate can be improved.

Certainly; when resources are limited, the electronic device may alternatively use only one awakening engine to process the N denoising signals to implement voice awakening. Specifically; the electronic device uses one awakening engine to serially process the N denoising signals, sequentially detects the awakening words in the N denoising signals, and generates a corresponding awakening event by using the awakening engine when the awakening word is detected, so as to implement voice awakening.

For ease of understanding, the following uses a specific example for description.

Figure 4:
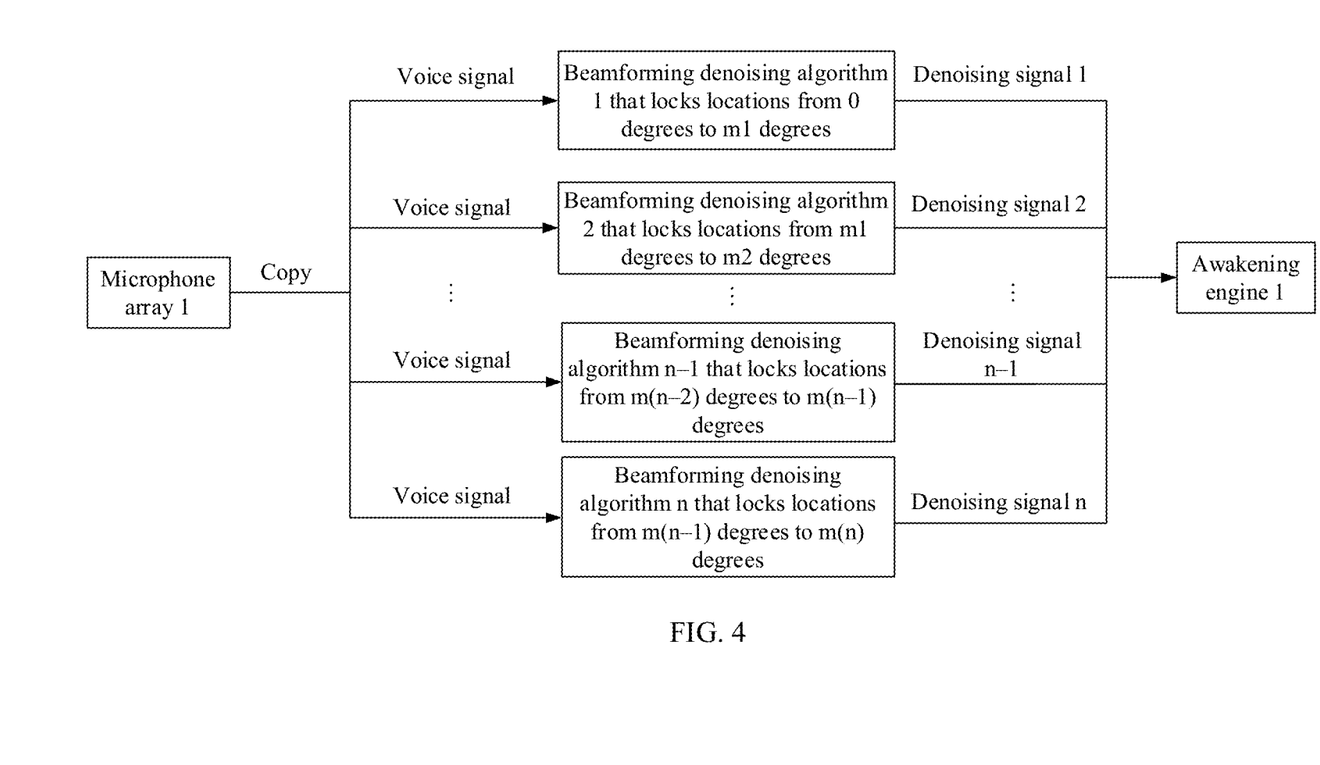
FIG. 4 is a flowchart of a voice awakening method according to an embodiment of this application.

FIG. 4 is a flowchart of a method for implementing voice awakening by using one microphone array and one awakening engine. As shown in FIG. 4, the microphone array 1 collects a voice signal, and the electronic device copies the voice signal collected by the microphone array to obtain N voice signals. Then the N voice signals are respectively input into N denoising algorithm modules in a one-to-one correspondence manner. The denoising algorithm modules store beamforming denoising algorithms, which are specifically beamforming denoising algorithm 1, beamforming denoising algorithm 2, . . . , beamforming denoising algorithm n. Beamforming denoising algorithm 1 locks beams at the location from 0 degrees to m1 degrees, beamforming denoising algorithm 2 locks beams at the location from m1 degrees to m2 degrees, and beamforming denoising algorithm n locks beams at the location from m(n−1) degrees to m(n) degrees. The foregoing N denoising algorithm modules perform denoising processing on the voice signal to obtain N denoising signals, and then send the N denoising signals to awakening engine 1, and awakening engine 1 performs voice awakening based on the N denoising signals.

Figure 5:
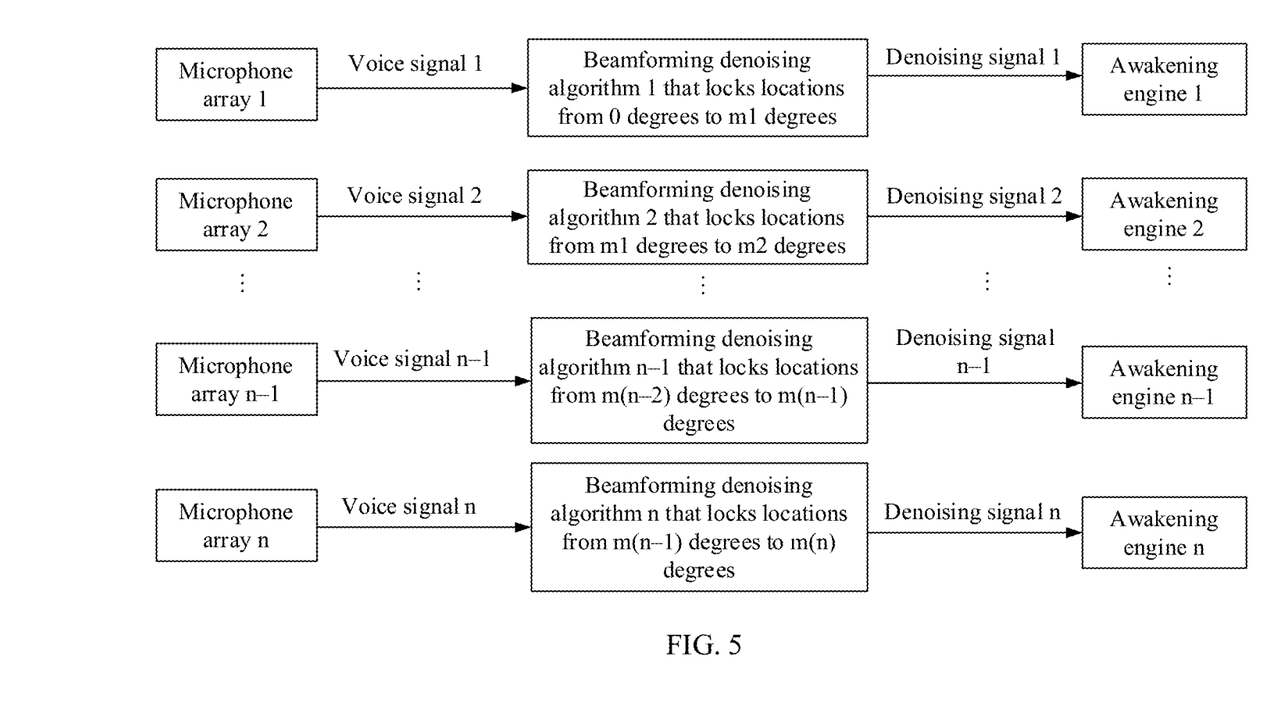
FIG. 5 is a flowchart of a voice awakening method according to an embodiment of this application.

FIG. 5 is a flowchart of a method for implementing voice awakening by using N microphone arrays and N awakening engines. As shown in FIG. 5, each microphone array collects one voice signal, and N microphone arrays collect N voice signals, which are specifically voice signal 1, voice signal 2, . . . , voice signal n, and then respectively input the voice signals into the N denoising algorithm modules in a correspondence. The parameter configuration of the N denoising algorithm modules is the same as that in FIG. 4. The denoising algorithm modules perform denoising processing by using the beamforming denoising algorithms to obtain N denoising signals, and then respectively send the denoising signals to awakening engine 1, awakening engine 2, . . . , and awakening engine n in a one-to-one correspondence. The N awakening engines detect awakening words based on denoising signals corresponding to the N awakening engines. If one awakening engine detects the awakening word, voice awakening is performed.

It can be learned from the foregoing description that, the embodiments of this application provide a voice awakening method. In this method, a microphone array is used to collect a voice signal, and denoising processing is separately performed on the voice signal by using N beamforming denoising algorithms to obtain N denoising signals, where each beamforming denoising algorithm corresponds to one of N areas, and different beamforming denoising algorithms correspond to different areas. Therefore, denoising processing can be performed on the voice signal based on a beam in the area corresponding to each beamforming denoising algorithm, and the denoising performance is not limited, thereby maximizing denoising performance of the denoising algorithms. In addition, the electronic device can cancel an echo outside a beam to enhance echo cancellation performance.

A union set of the N areas covers a signal collection area of the microphone array; and a sound source is inevitably located in at least one of the N areas. Specifically; the sound source may be located in one of the N areas or may be located in a plurality of areas such as two adjacent areas. Certainly; when there are a plurality of sound sources, the areas in which the sound sources are located may be a plurality of adjacent areas or may be a plurality of non-adjacent areas. At least one of the foregoing N beamforming denoising algorithms correctly locates the sound source. At least one of the N denoising signals obtained through denoising by using the N beamforming denoising algorithms has a good signal-to-noise ratio. The electronic device can perform voice awakening by using an awakening engine based on at least one of the N denoising signals, featuring a high awakening success rate and improving a voice awakening effect.

In addition, there is no need to locate the sound source before denoising, there is no risk of incorrect positioning, and there is no need to add an auxiliary positioning device. On the one hand, costs are reduced, and on the other hand, the method is easy to implement and popularize.

It can be understood that a size of the area directly affects a width of the beam, and further affects a denoising effect of the beamforming denoising algorithm. To achieve a good denoising effect, the value of N may be set properly so that the area size corresponding to the beamforming denoising algorithm can meet the need for denoising performance.

In some possible implementations, the electronic device can determine the value of N based on its own hardware processing capability; and then divide the signal collection area of the microphone array based on the value of N to obtain the N areas. During specific implementation, the value of N may be set to be proportional to the hardware processing capability within a specific range, and N increases with the increase of the hardware processing capability, and decreases with the decrease of the hardware processing capability: It should be noted that in some cases, when a beam angle is less than a preset angle such as 15°, the electronic device recognizes the noise as a voice signal emitted by the sound source, affecting the denoising performance. Based on this, the value of N may be set to be no greater than a preset value.

For ease of understanding, the following uses a specific example for description. For example, a hardware processing capability such as a computing capability of a smart speaker is relatively limited. In this case, the value of N may be set to a small value such as 3. A hardware processing capability of a smartphone is continuously enhanced with upgrading of a chip. In this case, the value of N may be set to a large value such as 10. It should be noted that, based on different hardware configurations, the hardware processing capabilities of different smartphones may be different. For a low-configuration mobile phone, N may be set to a small value such as 5. For a high-configuration mobile phone, N may be set to a large value such as 10.

It should be noted that a larger value of N indicates a larger quantity of areas, a larger calculation amount for the electronic device to perform denoising processing, and a higher requirement for power consumption of the electronic device. Based on this, in some possible implementations, the electronic device can alternatively determine the value of N based on the current service scenario type, and divide the signal collection area based on the value of N, so as to determine the N areas.

Specifically; the electronic device obtains the current service scenario type, and the current service scenario type represents a capability of the electronic device to provide a service in the current scenario. In an example of this application, the current service scenario type may include a low-power service scenario type or a standard-power service scenario type. If the current service scenario type is a low-power service scenario type, it indicates that remaining power of the electronic device is low; and only a low-power service or a basic service is provided. If the current service scenario type is a standard-power service scenario type, it indicates that remaining power of the electronic device is sufficient, and a service that can be provided is not limited. Both a low-power service and a high-power service can be provided. In addition to basic services, a value-added service can be provided. Then the electronic device searches for a parameter configuration file based on the current service scenario type, and determines the value of N that matches the current service scenario type, and then divides the signal collection area based on the value of N to obtain the N areas.

The parameter configuration file stores a correspondence between the service scenario type and N. The correspondence may be written into the parameter configuration file in advance based on an empirical value. After obtaining the current service scenario type, the electronic device determines the value of N based on the correspondence stored in the parameter configuration file.

A smart speaker is still used as an example. When remaining power of the smart speaker is 90%, it indicates that the remaining power is sufficient. The current service scenario type is a standard-power service scenario. After obtaining the current service scenario type, the electronic device searches the parameter configuration file to obtain the value of N. In this example, N may be 5, and then the electronic device divides the signal collection area into five parts to form five areas. In addition, the electronic device performs denoising processing on the voice signal by using beamforming denoising algorithms corresponding to the five areas, and the awakening engine determines whether to generate an awakening event based on the processed denoising signal.

With the continuous use of the smart speaker, the remaining power continuously decreases. When the remaining power is 10%, the current service scenario type is a low-power service scenario, and the electronic device provides a low-power service only. In this case, the electronic device searches the parameter configuration file to obtain the value of N. In this example, N may be 3. In this case, the electronic device re-divides the signal collection area, that is, divides the signal collection area into three parts to form three areas. In addition, the electronic device performs denoising processing on the voice signal by using beamforming denoising algorithms corresponding to the three areas, and the awakening engine determines whether to generate an awakening event based on the processed denoising signal, so as to implement voice awakening.

In this way; when the service scenario of the electronic device changes, the value of N can be automatically switched, so that the electronic device has good awakening performance in any service scenario.

In the foregoing embodiments, the N areas may be obtained by evenly dividing the signal collection area based on an angle. In this way, beam angles corresponding to the areas are the same. When N beamforming denoising algorithms are used to perform denoising processing on the voice signal, a good balance is achieved. Certainly, in other possible implementations of the embodiments of this application, the N areas may alternatively be uneven, which is not limited in this embodiment.

Considering that there may be a false awakening in actual application, the electronic device may further set some awakening policies to awaken the device or awaken an application when conditions specified by the awakening policies are met, thereby reducing a false awakening rate. Specifically; after performing denoising processing on the voice signal to obtain N denoising signals, the electronic device can determine similarity between each of the N denoising signals and an awakening word by using an awakening engine, and then perform voice awakening based on the similarity:

The embodiments of this application provide several implementations for performing voice awakening based on the similarity: An implementation is performing voice awakening if an average value of the similarity between each of the N denoising signals and the awakening word is greater than a preset threshold. Another implementation is performing voice awakening if the similarity between a preset quantity of denoising signals among the N denoising signals and the awakening word is greater than the preset threshold. Certainly, in actual application, voice awakening may be performed when the two conditions are both met, that is, an average value of the similarity between each of the N denoising signals and the awakening word is greater than a preset threshold, and the similarity between a preset quantity of denoising signals among the N denoising signals and the awakening word is greater than the preset threshold.

Because the similarity between the denoising signal and the awakening word can represent a probability that the voice signal carries the awakening word, when there are a plurality of denoising signals having relatively high similarity to the awakening word among the N denoising signals, or the average value of the similarity between the N denoising signals and the awakening word is relatively large, it indicates that there is a relatively high probability that the voice signal carries the awakening word. In this case, voice awakening may be performed: otherwise, voice awakening is not performed. Therefore, performing voice awakening based on the similarity can reduce a quantity of false awakenings and reduce a false awakening rate.

For ease of understanding of the technical solutions in this application, this application further provides a scenario embodiment to describe the voice awakening method.

Figure 6:
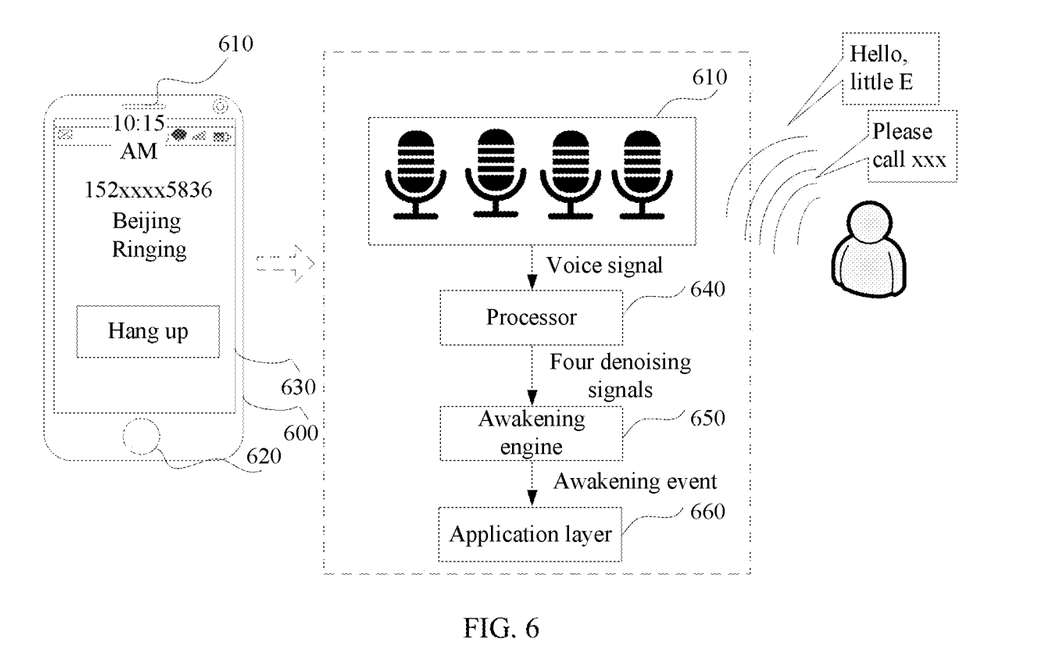
FIG. 6 is a schematic diagram of a scenario of a voice awakening method according to an embodiment of this application.

FIG. 6 is a schematic diagram of a scenario of a voice awakening method. The method is applied to a scenario of awakening a smartphone. The smartphone 600 includes a microphone array 610. The microphone array 610 is specifically a linear microphone array formed by four microphones. When the smartphone 600 is in a screen-off state, and when a user says "Hello, little E", the microphone array 610 collects a voice signal emitted by the user, and then transmits the voice signal to a processor 640 of the smartphone 600, and the processor 640 performs denoising processing on the voice signal. Specifically; the processor 640 first copies the foregoing voice signal to obtain four voice signals, and then performs denoising processing on the four voice signals by using four beamforming denoising algorithms corresponding to different areas. One beamforming denoising algorithm is used to process one voice signal, and different beamforming denoising algorithms process different voice signals. In this way; four denoising signals can be obtained, and then the four denoising signals are input into an awakening engine 650 of the smartphone 600. The awakening engine 650 recognizes, according to an awakening algorithm, that three of the foregoing denoising signals have similarity of 90% to the awakening word "Hello, little E". Therefore, the awakening engine 650 generates an awakening event and reports the awakening event to an application layer 660 of the smartphone 600, so as to awaken the smartphone 600.

The smartphone 600 may be awakened by flashing the Home button indicator 620. After the smartphone 600 is awakened, the microphone array 610 of the smartphone 600 continues to collect a voice signal. For example, when the user says "Please call xxx", the microphone array 610 can collect a voice signal corresponding to the content. After the voice signal is transmitted to the processor 640, the processor 640 can recognize the voice signal, and invoke a corresponding application based on a recognition result, for example, invoke the call application to make a call, as shown in an interface 630. In this way; voice interaction is implemented.

Figure 7:
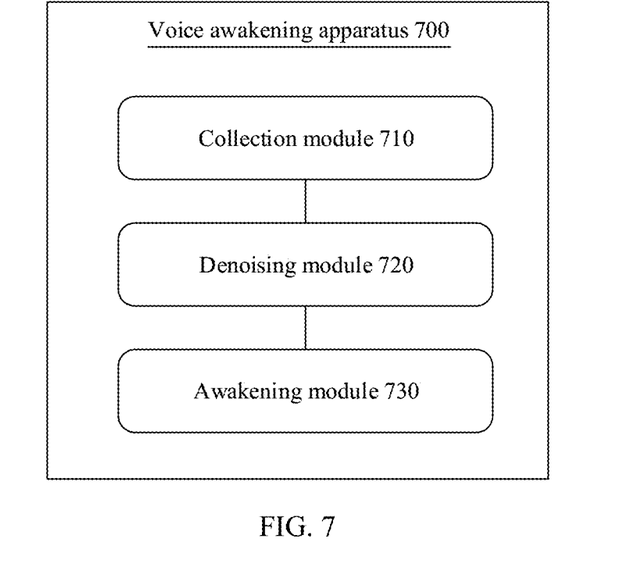
FIG. 7 is a schematic structural diagram of a voice awakening apparatus according to an embodiment of this application.

The foregoing describes the voice awakening method in this application, and the following describes an apparatus for performing the voice awakening method. The voice awakening apparatus provided in the embodiments of this application may be specifically any electronic device with a voice interaction function, including a smart household appliance, an intelligent terminal, a vehicle-mounted terminal, a wearable device, an AR/VR device, and the like. The electronic device has a function of implementing the voice awakening method provided in the embodiment corresponding to any one of FIG. 1 to FIG. 6. The function may be implemented by hardware, or may be implemented by hardware by executing corresponding software. The hardware or the software includes one or more modules corresponding to the function, and the module may be software and/or hardware. In some implementations, as shown in FIG. 7, the voice awakening apparatus 700 includes:

a collection module 710, configured to collect a voice signal by using a microphone array;

a denoising module 720, configured to separately perform denoising processing on the voice signal by using N beamforming denoising algorithms to obtain N denoising signals, where each beamforming denoising algorithm corresponds to one of N areas, different beamforming denoising algorithms correspond to different areas, a union set of the N areas covers a signal collection area of the microphone array; and N is a positive integer greater than 1; and an awakening module 730, configured to perform voice awakening by using an awakening engine based on at least one of the N denoising signals.

During specific implementation, the collection module 710 can be specifically configured to perform the method in S201. For details, refer to the description of part S201 in the method embodiment shown in FIG. 2. The denoising module 720 can be specifically configured to perform the method in S202. For details, refer to the description of part S202 in the method embodiment shown in FIG. 2. The awakening module 730 can be specifically configured to perform the method in S203. For details, refer to the description of part S203 in the method embodiment shown in FIG. 2. Details are not described herein again.

Optionally, the apparatus 700 further includes:
a first determining module, configured to determine a value of N based on a hardware processing capability, and divide the signal collection area based on the value of N to obtain the N areas.

During specific implementation, for the first determining module, refer to the description of related content about determining N areas in the embodiment shown in FIG. 2. Optionally, the apparatus 700 further includes:

a second determining module, configured to determine the value of N based on a current service scenario type, and divide the signal collection area based on the value of N to obtain the N areas.

Further, the second determining module is specifically configured to: when determining the value of N, search for a parameter configuration file based on the current service scenario type, and determine the value of N that matches the current service scenario type.

During specific implementation, for the second determining module, refer to the description of related content about determining N areas in the embodiment shown in FIG. 2.

Optionally, the N areas are obtained by evenly dividing the signal collection area based on an angle.

Optionally, the collection module 710 is specifically configured to:
collect a voice signal by using a single microphone array;
the denoising module 720 is specifically configured to:
copy the voice signal to obtain N voice signals; and
perform denoising processing on the N voice signals by using N beamforming denoising algorithms to obtain N denoising signals, where each beamforming denoising algorithm is used to process one of the N voice signals, and different beamforming denoising algorithms are used to process different voice signals.

During specific implementation, for the denoising module 720, refer to the description of related content in S202 in the embodiment shown in FIG. 2 and the description of related content in the embodiment shown in FIG. 4.

Optionally, the collection module 710 is specifically configured to:
collect a plurality of voice signals by using a plurality of microphone arrays, where each microphone array collects one voice signal;
the denoising module 720 is specifically configured to:
perform denoising processing on the N voice signals by using N beamforming denoising algorithms to obtain N denoising signals, where each beamforming denoising algorithm is used to process one of the N voice signals, and different beamforming denoising algorithms are used to process different voice signals.

During specific implementation, for the denoising module 720, refer to the description of related content in S202 in the embodiment shown in FIG. 2 and the description of related content in the embodiment shown in FIG. 5.

Optionally, the beamforming denoising algorithms include an adaptive beamforming denoising algorithm.

Optionally, the awakening module 730 is specifically configured to:
determine similarity between each of the N denoising signals and an awakening word by using the awakening engine; and
perform voice awakening based on the similarity.

During specific implementation, for the awakening module 730, refer to the description of related content after S203 in the embodiment shown in FIG. 2.

Optionally; that the awakening module 730 performs voice awakening based on the score specifically includes:
performing voice awakening if an average value of the similarity between each of the N denoising signals and the awakening word is greater than a preset threshold, and/or the similarity between a preset quantity of denoising signals among the N denoising signals and the awakening word is greater than the preset threshold.

During specific implementation, for the awakening module 730, refer to the description of related content after S203 in the embodiment shown in FIG. 2.

Figure 8:
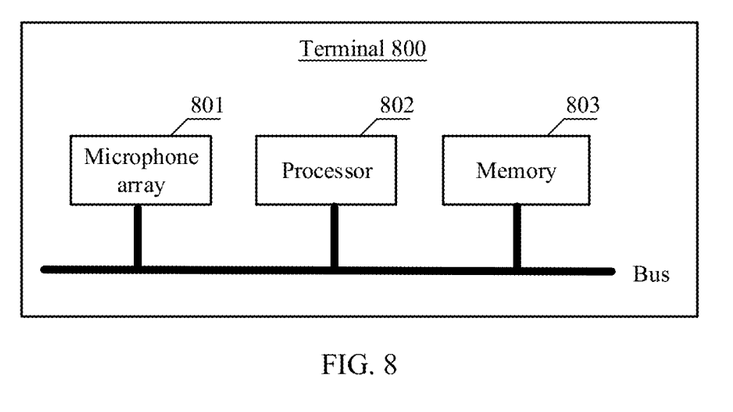
FIG. 8 is a schematic structural diagram of a terminal according to an embodiment of this application.

In addition, an embodiment of this application further provides an electronic device, and the electronic device may be a terminal. FIG. 8 is a schematic structural diagram of a terminal according to an embodiment of this application. The terminal 800 includes a microphone array 801, a processor 802, and a memory 803. The microphone array 801 is configured to collect a voice signal, the memory 803 is configured to store program code, and the processor 802 is configured to invoke the program code in the memory to perform the following steps to implement the voice awakening method provided in FIG. 2:

separately performing denoising processing on the voice signal by using N beamforming denoising algorithms to obtain N denoising signals, where each beamforming denoising algorithm corresponds to one of N areas, different beamforming denoising algorithms correspond to different areas, a union set of the N areas covers a signal collection area of the microphone array; and N is a positive integer greater than 1; and performing voice awakening by using an awakening engine based on at least one of the N denoising signals.

Optionally, the processor 802 is further configured to perform the following steps:

determining a value of N based on a hardware processing capability; and dividing the signal collection area based on the value of N to obtain the N areas.

Optionally, the processor 802 is further configured to perform the following steps:

determining the value of N based on a current service scenario type; and dividing the signal collection area based on the value of N to obtain the N areas.

Optionally, the processor 802 is further configured to perform the following steps:

searching for a parameter configuration file based on the current service scenario type, and determining the value of N that matches the current service scenario type.

Optionally, the processor 802 is further configured to:

evenly divide the signal collection area based on an angle to obtain the N areas.

Optionally, there is only one microphone array; and the processor 802 is specifically configured to: when performing denoising processing to obtain N denoising signals, copy the voice signal to obtain N voice signals; and perform denoising processing on the N voice signals by using N beamforming denoising algorithms to obtain N denoising signals, where each beamforming denoising algorithm is used to process one of the N voice signals, and different beamforming denoising algorithms are used to process different voice signals.

Optionally, there are a plurality of microphone arrays: each microphone array collects one voice signal, and the plurality of microphone arrays collect a plurality of voice signals; and the processor 802 is specifically configured to:

when the plurality of voice signals are N voice signals, perform denoising processing on the N voice signals by using N beamforming denoising algorithms to obtain N denoising signals, where each beamforming denoising algorithm is used to process one of the N voice signals, and different beamforming denoising algorithms are used to process different voice signals.

Optionally, the beamforming denoising algorithms include an adaptive beamforming denoising algorithm.

Optionally, the processor 802 is specifically configured to: when performing voice awakening by using the awakening engine based on at least one of the N denoising signals, determine similarity between each of the N denoising signals and an awakening word by using the awakening engine; and perform voice awakening based on the similarity.

Optionally, that the processor 802 performs voice awakening based on the score specifically includes:

performing voice awakening if an average value of the similarity between each of the N denoising signals and the awakening word is greater than a preset threshold, and/or the similarity between a preset quantity of denoising signals among the N denoising signals and the awakening word is greater than the preset threshold.

An embodiment of this application further provides a computer-readable storage medium, where the computer-readable storage medium is configured to store program code, and the program code is used to perform the voice awakening method according to this application.

An embodiment of this application further provides a computer program product that includes a computer-readable instruction, where when the computer-readable instruction runs on a computer, the computer is enabled to perform the voice awakening method according to the foregoing aspects.

It may be clearly understood by persons skilled in the art that, for ease and brevity of description, for a detailed working process of the foregoing system, apparatus, and unit, refer to a corresponding process in the foregoing method embodiments. Details are not described herein again.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected depending on actual needs to achieve the purposes of the solutions of the embodiments.

It should be understood that, in this application, "at least one" means one or more, and "a plurality of" means two or more. The term "and/or" is used to describe an association relationship between associated objects, and indicates that three relationships may exist. For example, "A and/or B" may represent the following three cases: Only A exists, only B exists, and both A and B exist. A and B may be singular or plural. The character "/" generally indicates an "or" relationship between associated objects. "At least one of the following" or a similar expression thereof indicates any combination of the following, and includes any combination of one or more of the following. For example, at least one of a, b, or c may represent a, b, c, "a and b", "a and c", "b and c", or "a and b and c", where a, b, and c may be singular or plural.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A voice awakening method implemented by an electronic device, the method comprising:
    collecting a voice signal by a microphone array of the electronic device;
    performing N denoising processing operations on the voice signal according to N beamforming denoising algorithms to form N denoising signals, wherein each of the N beamforming denoising algorithms is different from other of the N beamforming algorithms and uniquely corresponds to one of the N denoising signals, wherein each of the N denoising signals corresponds to one of N areas and a union set of the N areas covers a signal collection area of the microphone array, and wherein N is a positive integer greater than 1;
    selecting at least one of the N denoising signals that has a signal-to-noise ratio greater than a threshold value; and
    performing voice awakening by using an awakening engine based on the selected at least one of the N denoising signals.

2. The method of claim 1, wherein a value of N is based on a hardware processing capability of the electronic device, and wherein the method further comprises dividing the signal collection area based on the value of N to obtain the N areas.

3. The method of claim 1, wherein a value of N is based on a current service scenario type, and wherein the method further comprises dividing the signal collection area based on the value of N to obtain the N areas.

4. The method of claim 3, further comprising searching for a parameter configuration file based on the current service scenario type, wherein the value of N being based on the current service scenario type is based on a correspondence between the service scenario type and N stored in the parameter configuration file.

5. The method of claim 4, wherein the N areas are obtained by evenly dividing the signal collection area based on an angle.

6. The method of claim 4, wherein the voice signal is collected by a single microphone array, and wherein performing N denoising processing operations on the voice signal comprises:
    copying the voice signal to obtain N voice signals; and
    performing denoising processing on the N voice signals by using the N beamforming denoising algorithms to obtain the N denoising signals,
    wherein each beamforming denoising algorithm is used to process one of the N voice signals, and
    wherein different beamforming denoising algorithms are used to process different voice signals.

7. The method of claim 4, further comprising collecting a plurality of voice signals by a plurality of microphone arrays, wherein each microphone array collects one voice signal, wherein if the plurality of voice signals are N voice signals, performing N denoising processing operations on the voice signal comprises performing N denoising processing operations on the N voice signals by using the N beamforming denoising algorithms to obtain the N denoising signals, wherein each beamforming denoising algorithm is used to process one of the N voice signals, and wherein different beamforming denoising algorithms are used to process different voice signals.

8. The method of claim 4, wherein the beamforming denoising algorithms comprise an adaptive beamforming denoising algorithm.

9. The method of claim 4, wherein performing voice awakening by using the awakening engine based on at least one of the N denoising signals comprises performing, by the awakening engine, voice awakening based on a similarity between each of the N denoising signals and an awakening word.

10. The method of claim 9, wherein performing voice awakening based on the similarity comprises performing voice awakening if an average value of the similarity between each of the N denoising signals and the awakening word is greater than a preset threshold, and/or a similarity between a preset quantity of denoising signals among the N denoising signals and the awakening word is greater than the preset threshold.

11. A voice awakening apparatus, wherein the apparatus comprises:
    one or more processors; and
    a memory coupled to the one or more processors and storing instructions that, when executed by the one or more processors, cause the one or more processors to be configured to implement a collection module, a denoising module, and an awakening module,
    wherein the collection module is configured to collect a voice signal by using a microphone array,
    wherein the denoising module is configured to:
        perform N denoising processing operations on the voice signal according to N beamforming denoising algorithms to form N denoising signals, wherein each of the N beamforming denoising algorithms is different from other of the N beamforming algorithms and uniquely corresponds to one of the N denoising signals, wherein each of the N denoising signals corresponds to one of N areas and a union set of the N areas covers a signal collection area of the microphone array, and wherein N is a positive integer greater than 1; and
        select at least one of the N denoising signals that has a signal-to-noise ratio greater than a threshold value, and
    wherein the awakening module is configured to perform voice awakening by using an awakening engine based on the selected at least one of the N denoising signals.

12. An electronic device, comprising:
    a microphone array configured to collect a voice signal;
    a memory configured to store program code; and
    one or more processors coupled to the microphone array and the memory, wherein the one or more processors are configured to execute instructions in the program code, wherein the instructions, when executed, cause the one or more processors to be configured to:
        perform N denoising processing operations on the voice signal according to N beamforming denoising algorithms to form N denoising signals, wherein each of the N beamforming denoising algorithms is different from other of the N beamforming algorithms and uniquely corresponds to one of the N denoising signals, wherein each of the N denoising signals corresponds to one of N areas and a union set of the N areas covers a signal collection area of the microphone array, and wherein N is a positive integer greater than 1;

select at least one of the N denoising signals that has a signal-to-noise ratio greater than a threshold value; and perform voice awakening by using an awakening engine based on the selected at least one of the N denoising signals.

13. The electronic device of claim 12, wherein a value of N is based on a hardware processing capability of the electronic device, and wherein the instructions, when executed by the one or more processors, cause the one or more processors to be configured to divide the signal collection area based on the value of N to obtain the N areas.

14. The electronic device of claim 12, wherein a value of N is based on a current service scenario type, and wherein the instructions, when executed by the one or more processors, cause the one or more processors to be configured to divide the signal collection area based on the value of N to obtain the N areas.

15. The electronic device of claim 14, wherein the instructions, when executed by the one or more processors, cause the one or more processors to be configured to search for a parameter configuration file based on the current service scenario type, wherein the value of N being based on the current service scenario type is based on a correspondence between the service scenario type and N stored in the parameter configuration file.

16. The electronic device of claim 15, wherein the one or more processors are further configured to evenly divide the signal collection area based on an angle to obtain the N areas.

17. The electronic device of claim 15, wherein the electronic device comprises only one microphone array, and wherein to perform the N denoising processing operations, the one or more processors are configured to:

copy the voice signal to obtain N voice signals; and perform denoising processing on the N voice signals by using the N beamforming denoising algorithms to obtain the N denoising signals, wherein each beamforming denoising algorithm is used to process one of the N voice signals, and wherein different beamforming denoising algorithms are used to process different voice signals.

18. The electronic device of claim 15, further comprising a plurality of microphone arrays, wherein each microphone array collects one voice signal, wherein the plurality of microphone arrays collect a plurality of voice signals, and wherein when the plurality of voice signals are N voice signals, the one or more processors are configured to perform N denoising processing operations on the N voice signals by using the N beamforming denoising algorithms to obtain the N denoising signals, wherein each beamforming denoising algorithm is used to process one of the N voice signals, and wherein different beamforming denoising algorithms are used to process different voice signals.

19. The electronic device of claim 15, wherein the beamforming denoising algorithms comprise an adaptive beamforming denoising algorithm.

20. The electronic device of claim 15, wherein the one or more processors are further configured to perform, by the awakening engine, voice awakening based on a similarity between each of the N denoising signals and an awakening word.

* * * * *

UNITED STATES PATENT AND TRADEMARK OFFICE
CERTIFICATE OF CORRECTION

PATENT NO. : 12,494,217 B2
APPLICATION NO. : 17/598702
DATED : December 9, 2025
INVENTOR(S) : Liwen Chen and Ke Zhang Page 1 of 1

It is certified that error appears in the above-identified patent and that said Letters Patent is hereby corrected as shown below:

In the Claims

Claim 4, Column 19, Line 51: "between the service scenario" should read "between the current service scenario"

Claim 15, Column 21, Line 35: "between the service scenario" should read "between the current service scenario"

Signed and Sealed this
Sixth Day of January, 2026

John A. Squires
*Director of the United States Patent and Trademark Office*